United States Patent Office.

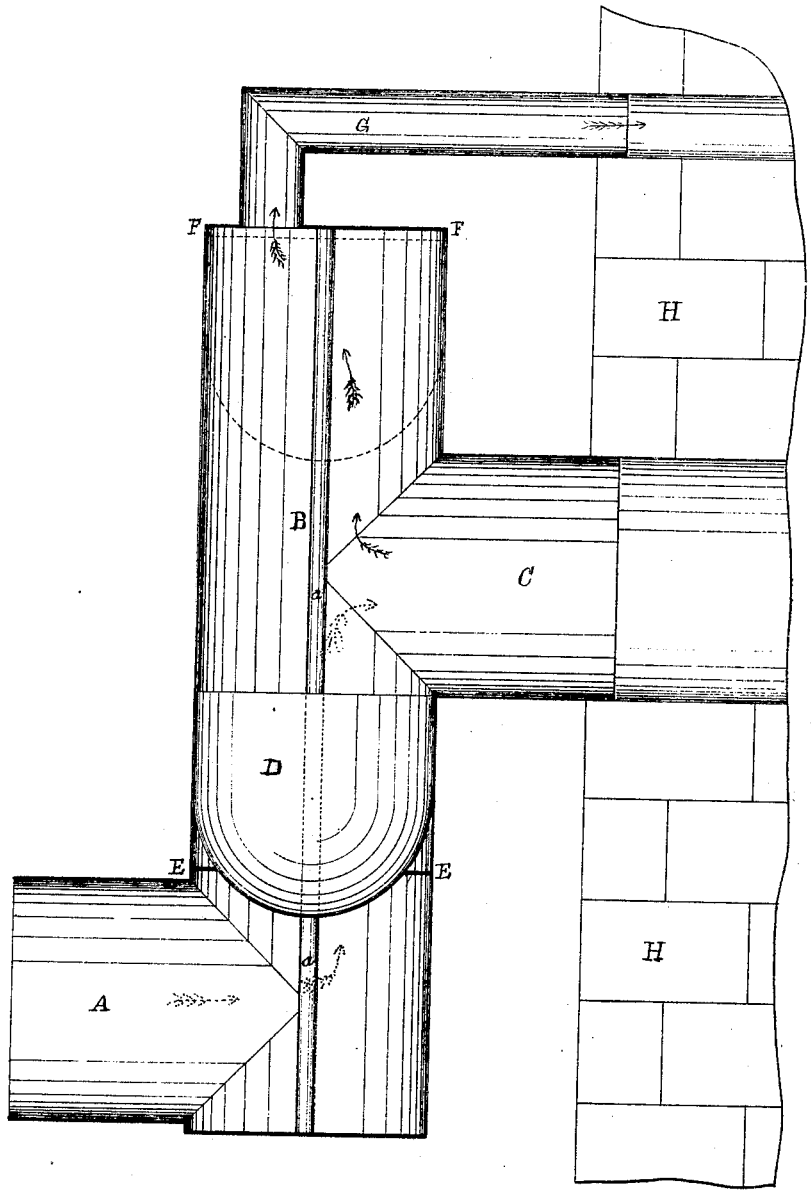

PETER SWEENY, OF NEW YORK, N. Y.

Letters Patent No. 112,192, dated February 28, 1871.

IMPROVEMENT IN TUYERES.

The Schedule referred to in these Letters Patent and making part of the same.

*To all whom it may concern:*

Be it known that I, PETER SWEENY, of the city, county, and State of New York, have invented certain Improvements in Tuyeres for preventing the entrance of the gases from the fire in forges into the air-pipe leading from the bellows or fan to the fire, of which the following is a specification, reference being had to the accompanying drawing forming a part thereof.

My invention consists in placing in the tuyere or air-pipe leading from the bellows or other blowing device to the fire in forges, furnaces, &c., a valve so constructed and arranged that while it permits the air to pass without obstruction from the bellows to the fire, it prevents the return of any air or gas from the forge or fire through the air-pipe toward the bellows, causing such air or gas to be discharged through a separate pipe into the smoke-stack or into the open air.

A is the air-pipe leading from the bellows or fan toward the forge.

B is the valve-pipe into which the pipe A opens.

C is a pipe leading from the valve-pipe to the forge.

D is the valve arranged within the valve-pipe B. This valve may be made in any form desired.

A hollow light metal sphere or half-sphere, or a valve made in the shape shown in the drawing, will be found suitable. It may be placed and allowed to slide upon a rod, $a$, in the center of the pipe B, extending from end to end.

E is a valve-seat, against which the valve closes the communication between the pipes A and C.

F is a valve-seat, against which the valve closes the communication between the pipes G and C.

G is a pipe leading from the valve-pipe B into the smoke-stack.

H is a portion of the forge.

The valve-pipe is to be placed in a vertical position, or so nearly so, that the valve D, when the air is at rest in the pipe B, will fall of its own weight upon the seat E.

It is evident that when a current of air is drawn through the pipe A the valve D will be thereby forced and held up against the valve-seat F, thus closing the pipe G and allowing the air to pass freely through the pipe C to the forge H, and that when the movement of the air ceases the valve D will fall down upon the valve-seat E, closing all communication between the fire in the forge and the pipe A leading from the bellows, and opening the pipe G leading to the smoke-stack.

When, therefore, the blast is on, the air passes freely from the bellows to the fire, not being permitted to escape elsewhere. But as soon as the blast ceases, the communication between the fire and the bellows being closed, and the communication between the fire and the smoke-stack, through the pipes C and G, being open, the gases from the fire, if they are forced back through the pipe C, cannot enter the pipe A, but will escape through the pipe G into the smoke-stack.

By these means all danger resulting from the escape of inflammatory and explosive gases from the fire of forges into the bellows or pipes leading thereto, is obviated.

What I claim as my invention, and desire to secure by Letters Patent, is—

The pipes A, B, C, and G with the valve D, combined and arranged substantially as and for the purpose described.

PETER SWEENY.

Witnesses:
A. F. FITCH,
GEO. GOTT.